(12) United States Patent
Moniz et al.

(10) Patent No.: US 10,760,589 B2
(45) Date of Patent: Sep. 1, 2020

(54) TURBOFAN ENGINE ASSEMBLY AND METHODS OF ASSEMBLING THE SAME

(71) Applicant: General Electric Company, Schenectady, NY (US)

(72) Inventors: Thomas Ory Moniz, Loveland, OH (US); Joseph George Rose, Mason, OH (US); Paul Daniel Kemper, Loveland, OH (US)

(73) Assignee: General Electric Company, Schenectady, NY (US)

( * ) Notice: Subject to any disclaimer, the term of this patent is extended or adjusted under 35 U.S.C. 154(b) by 302 days.

(21) Appl. No.: 14/982,437

(22) Filed: Dec. 29, 2015

(65) Prior Publication Data

US 2017/0184124 A1 Jun. 29, 2017

(51) Int. Cl.
*F02K 3/06* (2006.01)
*F04D 29/54* (2006.01)
(Continued)

(52) U.S. Cl.
CPC ........... *F04D 29/542* (2013.01); *F01D 9/041* (2013.01); *F01D 25/162* (2013.01); *F01D 25/243* (2013.01); *F01D 25/246* (2013.01); *F02C 3/04* (2013.01); *F02K 3/06* (2013.01); *F04D 29/522* (2013.01); *F04D 29/644* (2013.01); *F05D 2220/323* (2013.01); *F05D 2230/60* (2013.01); *F05D 2230/70* (2013.01); *F05D 2240/12* (2013.01); *F05D 2240/129* (2013.01); *F05D 2240/35* (2013.01); *F05D 2240/80* (2013.01);
(Continued)

(58) Field of Classification Search
CPC ...... F04D 29/542; F01D 9/041; F01D 25/243; F02K 3/06; F05D 2240/12; F05D 2240/80
See application file for complete search history.

(56) References Cited

U.S. PATENT DOCUMENTS

| 4,418,528 A | 12/1983 | Pellow |
| 4,916,894 A | 4/1990 | Adamson et al. |

(Continued)

FOREIGN PATENT DOCUMENTS

| EP | 1 918 527 A2 | 5/2008 |
| EP | 2 647 847 A1 | 10/2013 |
| WO | 2015/017001 A2 | 2/2015 |

OTHER PUBLICATIONS

Extended European Search Report and Opinion issued in connection with corresponding EP Application No. 16203391.4 dated May 15, 2017.

*Primary Examiner* — Steven M Sutherland
(74) *Attorney, Agent, or Firm* — Dority & Manning, P.A.

(57) ABSTRACT

A turbofan engine assembly includes a core gas turbine engine with a booster compressor having a radially outer diameter, a fan case assembly, and an outlet guide vane assembly. The outlet guide vane assembly includes a plurality of outlet guide vane segments spaced circumferentially about the core gas turbine engine. Each outlet guide vane segment of the plurality of outlet guide vane segments includes a radially inner fan hub frame flange configured to couple to the core gas turbine engine, a radially outer fan case flange configured to couple to the fan case assembly, and a plurality of outlet guide vanes extending therebetween. The radially inner diameter of the outlet guide vane assembly is smaller than the radially outer diameter of the booster compressor.

20 Claims, 4 Drawing Sheets

(51) Int. Cl.

| | | |
|---|---|---|
| *F01D 9/04* | (2006.01) | |
| *F01D 25/24* | (2006.01) | |
| *F01D 25/16* | (2006.01) | |
| *F02C 3/04* | (2006.01) | |
| *F04D 29/52* | (2006.01) | |
| *F04D 29/64* | (2006.01) | |

(52) U.S. Cl.
CPC ......... *F05D 2250/36* (2013.01); *Y02T 50/671* (2013.01); *Y02T 50/673* (2013.01)

(56) References Cited

U.S. PATENT DOCUMENTS

| | | |
|---|---|---|
| 5,222,360 A | 6/1993 | Antuna et al. |
| 5,307,623 A | 5/1994 | Antuna et al. |
| 5,765,993 A | 6/1998 | Weiss |
| 7,614,848 B2 | 11/2009 | Bogue et al. |
| 7,730,715 B2 | 6/2010 | Grudnoski et al. |
| 7,743,497 B2 | 6/2010 | Gautreau et al. |
| 2007/0264128 A1* | 11/2007 | Grudnoski ............ F01D 25/162 416/244 R |
| 2010/0209235 A1* | 8/2010 | Shim ................ B23P 15/04 415/200 |
| 2013/0202425 A1 | 8/2013 | Balk |
| 2013/0287562 A1* | 10/2013 | Ishigure ............. F01D 5/282 415/208.1 |
| 2014/0140832 A1 | 5/2014 | Hasting et al. |

* cited by examiner

TURBOFAN ENGINE ASSEMBLY AND METHODS OF ASSEMBLING THE SAME

BACKGROUND

The field of the disclosure relates generally to gas turbine engines and, more particularly, to a gas turbine engine assembly and methods of assembling the same.

At least some known gas turbine engines are split into two major assemblies, a fan case assembly and a core engine assembly, simplifying maintenance and shipping. The fan case assembly and core engine assembly are generally coupled together via an outlet guide vane assembly. To remove the core engine assembly from the fan case assembly, the core engine assembly is decoupled from the outlet guide vane assembly such that the core engine assembly can be shifted axially and removed from the fan case assembly and the outlet guide vane assembly. For this disassembly, the outside diameter of the core engine assembly is smaller than the inside diameter of the outlet guide vane assembly such that the core engine assembly can fit therebetween. When the fan case assembly including the outlet guide vane assembly is sized to fit over the core engine assembly, the diameter of the fan case assembly, including core cowl, fan case, and nacelle, is increased, thereby increasing overall engine weight and drag.

BRIEF DESCRIPTION

In one aspect, a turbofan engine assembly is provided. The turbofan engine assembly includes a core gas turbine engine with a booster compressor having a radially outer diameter, a fan case assembly, and an outlet guide vane assembly. The outlet guide vane assembly includes a plurality of outlet guide vane segments spaced circumferentially about the core gas turbine engine. Each outlet guide vane segment of the plurality of outlet guide vane segments includes a radially inner fan hub frame flange configured to couple to the core gas turbine engine, a radially outer fan case flange configured to couple to the fan case assembly, and a plurality of outlet guide vanes extending therebetween. The radially inner diameter of the outlet guide vane assembly is smaller than the radially outer diameter of the booster compressor.

In another aspect, an aircraft including an engine is provided. The engine includes a core gas turbine engine with a booster compressor having a radially outer diameter, a fan case assembly, and an outlet guide vane assembly. The outlet guide vane assembly includes a plurality of outlet guide vane segments spaced circumferentially about the core gas turbine engine. Each outlet guide vane segment of the plurality of outlet guide vane segments includes a radially inner fan hub frame flange configured to couple to the core gas turbine engine, a radially outer fan case flange configured to couple to the fan case assembly, and a plurality of outlet guide vanes extending therebetween. The radially inner diameter of the outlet guide vane assembly is smaller than the radially outer diameter of the booster compressor.

In yet another aspect, a method of assembling a turbofan engine assembly is provided. The method includes coupling a core gas turbine engine including a booster compressor having a radially outer diameter to a fan case assembly via an outlet guide vane assembly. The outlet guide vane assembly includes a plurality of outlet guide vane segments spaced circumferentially about the core gas turbine engine. The outlet guide vane segments include a radially inner fan hub frame flange, a radially outer fan case flange, and a plurality of outlet guides vanes extending therebetween. The coupling a core gas turbine engine includes coupling the radially outer fan case flange to the fan case assembly, and coupling the radially inner fan hub fame flange to the core gas turbine engine, wherein a radially inner diameter of the outlet guide vane assembly is smaller than the radially outer diameter of the booster compressor.

DRAWINGS

These and other features, aspects, and advantages of the present disclosure will become better understood when the following detailed description is read with reference to the accompanying drawings in which like characters represent like parts throughout the drawings, wherein.

Unless otherwise indicated, the drawings provided herein are meant to illustrate features of embodiments of this disclosure. These features are believed to be applicable in a wide variety of systems comprising one or more embodiments of this disclosure. As such, the drawings are not meant to include all conventional features known by those of ordinary skill in the art to be required for the practice of the embodiments disclosed herein.

DETAILED DESCRIPTION

In the following specification and the claims, reference will be made to a number of terms, which shall be defined to have the following meanings.

The singular forms "a," "an," and "the" include plural references unless the context clearly dictates otherwise.

"Optional" or "optionally" means that the subsequently described event or circumstance may or may not occur, and that the description includes instances where the event occurs and instances where it does not.

Approximating language, as used herein throughout the specification and claims, may be applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value. Here and throughout the specification and claims, range limitations may be combined and/or interchanged; such ranges are identified and include all the sub-ranges contained therein unless context or language indicates otherwise.

Embodiments of the turbofan engine assembly described herein facilitate reducing the outer diameter of the fan case assembly and/or increasing fan diameter. Specifically, the turbofan engine assemblies and methods described herein allow for the outer diameter of the core gas turbine engine to be smaller than the inner diameter of the outlet guide vane assembly. The outlet guide vane assembly includes a plurality of outlet guide vane segments spaced circumferentially about the core gas turbine engine. Each outlet guide vane segment includes a radially inner fan hub frame flange configured to couple to the core gas turbine engine, a radially outer fan case flange configured to couple to the fan case assembly, and a plurality of outlet guide vanes extending therebetween. The core gas turbine engine is removable from the fan case assembly by decoupling at least one outlet guide vane segment from the core gas turbine engine and/or fan case assembly and shifting the core gas turbine engine in a radial direction before moving in an axial direction. Disassembling the turbofan engine assembly as described herein provides for maintaining the time requirement to remove the turbofan engine assembly to one working shift and enabling conventional shipping means for the core gas engine turbine assembly. Additionally, the turbofan engine assembly described herein offers advantages that include, without limitation, reducing the outer diameter of the fan case assembly, reducing overall engine weight, reducing nacelle drag, reducing time to split core gas turbine engine and fan case assembly, increasing fan diameter and air flow, and increasing booster compressor outer diameter.

Figure 1:
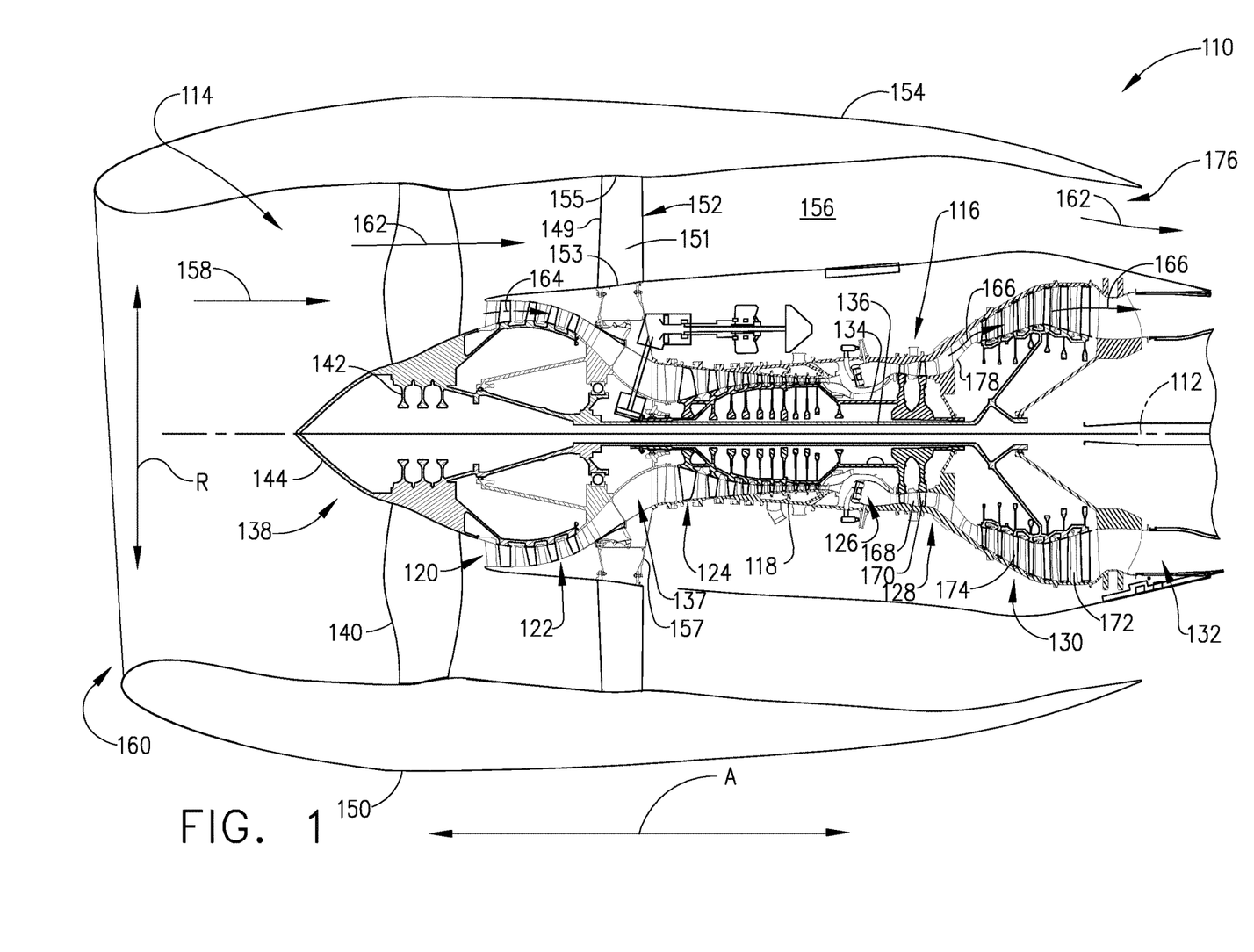
FIG. 1 is a schematic illustration of an exemplary gas turbine engine in accordance with an example embodiment of the present disclosure.

FIG. 1 is a schematic cross-sectional view of a gas turbine engine in accordance with an exemplary embodiment of the present disclosure. In the exemplary embodiment, the gas turbine engine is a high-bypass turbofan jet engine 110, referred to herein as "turbofan engine 110." As shown in FIG. 1, turbofan engine 110 defines an axial direction A (extending parallel to a longitudinal centerline 112 provided for reference) and a radial direction R (extending perpendicular to longitudinal centerline 112). In general, turbofan engine 110 includes a fan case assembly 114 and a core gas turbine engine 116 disposed downstream from fan case assembly 114.

Core gas turbine engine 116 includes a substantially tubular outer casing 118 that defines an annular inlet 120. Outer casing 118 encases, in serial flow relationship, a compressor section including a booster or low pressure (LP) compressor 122 and a high pressure (HP) compressor 124; a combustion section 126; a turbine section including a high pressure (HP) turbine 128 and a low pressure (LP) turbine 130; and a jet exhaust nozzle section 132. A high pressure (HP) shaft or spool 134 drivingly connects HP turbine 128 to HP compressor 124. A low pressure (LP) shaft or spool 136 drivingly connects LP turbine 130 to booster compressor 122. The compressor section, combustion section 126, turbine section, and nozzle section 132 together define a core air flow path 137.

In the exemplary embodiment, fan case assembly 114 includes a fan 138 having a plurality of fan blades 140 coupled to a disk 142 in a spaced apart manner. As depicted, fan blades 140 extend outwardly from disk 142 generally along radial direction R. Fan blades 140 and disk 142 are together rotatable about longitudinal centerline 112 by LP shaft 136.

Referring still to the exemplary embodiment of FIG. 1, disk 142 is covered by rotatable front hub 144 aerodynamically contoured to promote an airflow through plurality of fan blades 140. Additionally, exemplary fan case assembly 114 includes an annular fan casing or outer nacelle 150 that circumferentially surrounds fan 138 and/or at least a portion of core gas turbine engine 116. It should be appreciated that nacelle 150 may be configured to be supported relative to core gas turbine engine 116 by an outlet guide vane assembly 152. Moreover, a downstream section 154 of nacelle 150 may extend over an outer portion of core gas turbine engine 116 so as to define a bypass airflow passage 156 therebetween.

Moreover, in the exemplary embodiment, outlet guide vane assembly 152 includes a plurality of outlet guide vane segments 149 spaced circumferentially about core gas turbine engine 116. Each outlet guide vane segment 149 includes a plurality of outlet guide vanes 151 that are removable and extend between a radially inner fan hub frame flange 153 and a radially outer fan case flange 155. Radially inner fan hub frame flange 153 is removably coupled to core gas turbine engine 116 via a fan frame hub 157. Specifically, radially inner fan hub frame flange 153 is removably coupled to fan frame hub 157 between booster compressor 122 and HP compressor 124. Additionally, each outlet guide vane segment 149 includes radially outer fan case flange 155 that is removably coupled to fan case assembly 114. Specifically, radially outer fan case flange 155 is removably coupled to outer nacelle 150. Generally, outlet guide vane assembly 152 facilitates fan case assembly 114 removably coupling to core gas turbine engine 116 such that at least a portion of core gas turbine 116 engine is circumferentially surround by fan case assembly 114 as illustrated in FIG. 1.

During operation of turbofan engine 110, a volume of air 158 enters turbofan 110 through an associated inlet 160 of nacelle 150 and/or fan case assembly 114. As air 158 passes across fan blades 140, a first portion of air 158 as indicated by arrows 162 is directed or routed into bypass airflow passage 156 and a second portion of air 158 as indicated by arrows 164 is directed or routed into core air flow path 137, or more specifically into booster compressor 122. The ratio between first portion of air 162 and second portion of air 164 is commonly known as a bypass ratio. The pressure of second portion of air 164 is then increased as it is routed through HP compressor 124 and into combustion section 126, where it is mixed with fuel and burned to provide combustion gases 166.

Combustion gases 166 are routed through HP turbine 128 where a portion of thermal and/or kinetic energy from combustion gases 166 is extracted via sequential stages of HP turbine stator vanes 168 that are coupled to outer casing 118 and HP turbine rotor blades 170 that are coupled to HP shaft or spool 134, thus causing HP shaft or spool 134 to rotate, thereby supporting operation of HP compressor 124. Combustion gases 166 are then routed through LP turbine 130 where a second portion of thermal and kinetic energy is extracted from combustion gasses 166 via sequential stages of LP turbine stator vanes 172 that are coupled to outer casing 118 and LP turbine rotor blades 174 that are coupled to LP shaft or spool 136, thus causing LP shaft or spool 136 to rotate, thereby supporting operation of booster compressor 122 and/or rotation of fan 138. Combustion gases 166 are subsequently routed through jet exhaust nozzle section 132 of core gas turbine engine 116 to provide propulsive thrust. Simultaneously, the pressure of first portion of air 162 is substantially increased as first portion of air 162 is routed through bypass airflow passage 156, including through outlet guide vane assembly 152 wherein radially inner fan hub frame flange 153 defines the inner flowpath and radially outer fan case flange 155 defines the outer flowpath through outlet guide vanes 151, before it is exhausted from a fan nozzle exhaust section 176 of turbofan 110, also providing propulsive thrust. HP turbine 128, LP turbine 130, and jet exhaust nozzle section 132 at least partially define a hot gas path 178 for routing combustion gases 166 through core gas turbine engine 116.

It should be appreciated, however, that exemplary turbofan engine 110 depicted in FIG. 1 is by way of example only, and that in other exemplary embodiments, turbofan engine 110 may have any other suitable configuration. It should also be appreciated, that in still other exemplary embodiments, aspects of the present disclosure may be incorporated into any other suitable gas turbine engine. For example, in other exemplary embodiments, aspects of the present disclosure may be incorporated into, e.g., a turboprop engine.

Figure 2:
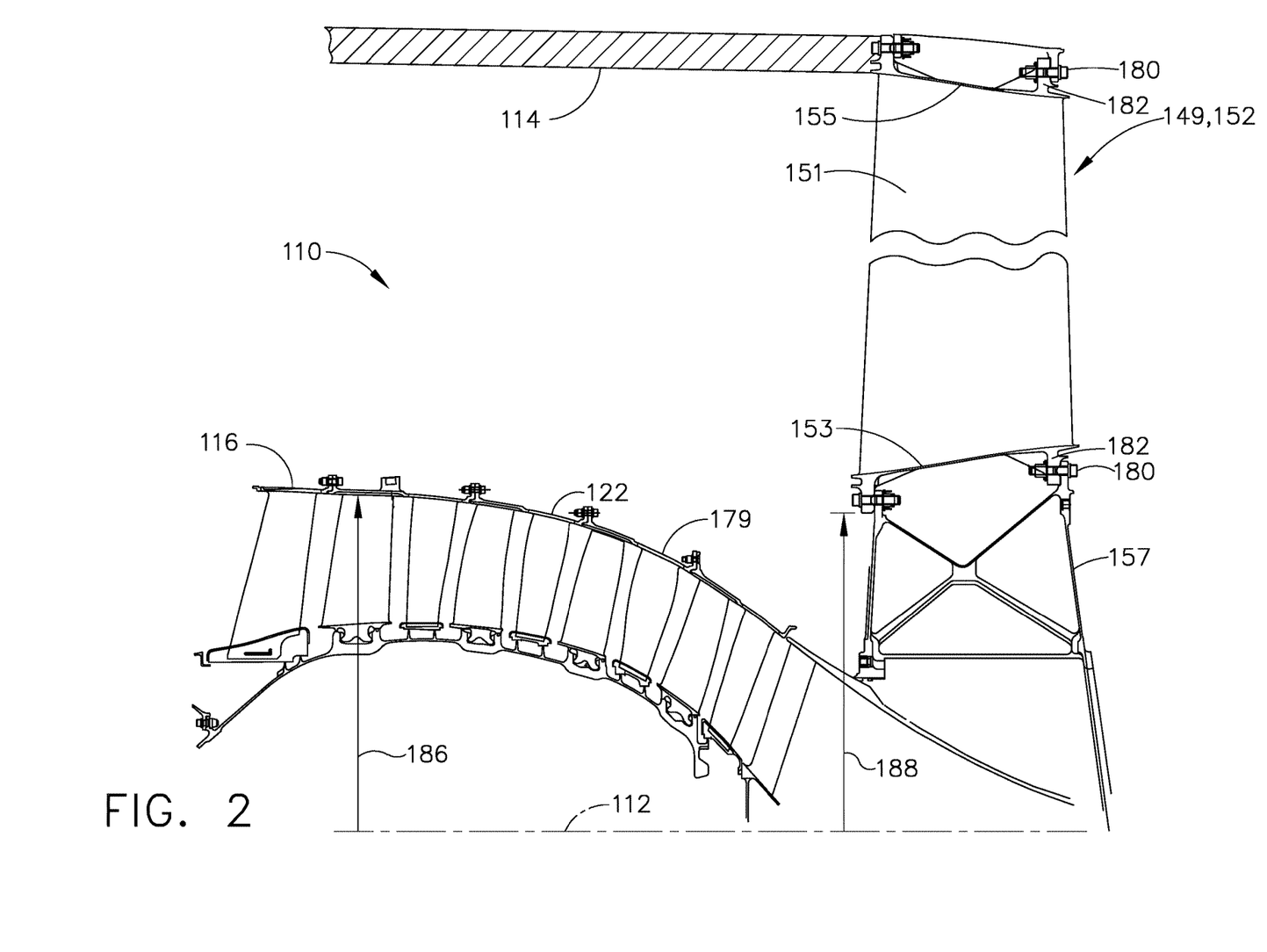
FIG. 2 is a schematic side view of an exemplary outer guide vane segment from the turbofan engine shown in FIG. 1.

FIG. 2 is a schematic side view of outlet guide vane segment 149 from turbofan engine 110 (shown in FIG. 1). In the exemplary embodiment, outlet guide vane segment 149 is coupled to a booster compressor casing 179 aft of booster compressor 122. Specifically, radially inner fan hub frame flange 153 is removably coupled via a plurality of bolts 180 and bolt flanges 182 spaced circumferentially about core gas turbine engine 116 to a structural support member, such as fan frame hub 157, which is coupled to booster compressor casing 179. Additionally, outlet guide vane segment 149 via radially outer fan case flange 155 is removably coupled to fan case assembly 114 via a similar plurality of bolts 180 and bolt flanges 182 spaced circumferentially about core gas turbine engine 116. In alternative embodiments, outlet guide vane segment 149 is coupled to core gas turbine engine 116 and/or fan case assembly 114 using any other connection method that enables turbofan engine 110 to be assembled as described herein.

In the exemplary embodiment, booster compressor 122 has a radially outer diameter defined by a radius 186 from longitudinal centerline 112. Additionally, outlet guide vane assembly 152 has a radially inner diameter defined by a radius 188 from longitudinal centerline 112. Fan case assembly 114 is removably coupled to core gas turbine engine 116 via outlet guide vane assembly 152 such that the radially inner diameter of outlet guide vane assembly 152 is smaller than the radially outer diameter of booster compressor 122. When the radially inner diameter of outlet guide vane assembly 152 is reduced the diameter of fan case assembly 114 and outer nacelle 150 may be reduced such that turbofan engine 110 weight and drag is lowered. Additionally, when the radially inner diameter of outlet guide vane assembly 152 is reduced turbofan engine 110 may receive a larger diameter fan 138 such that air flow 158 therethrough is increased without increasing the diameter of outer nacelle 150. Moreover, when the radially outer diameter of booster compressor 122 is not linked to the radially inner diameter of outlet guide vane assembly 152, turbofan engine 110 may receive booster compressor 122 with a larger radially outer diameter such that engine power is increased.

Figure 3:
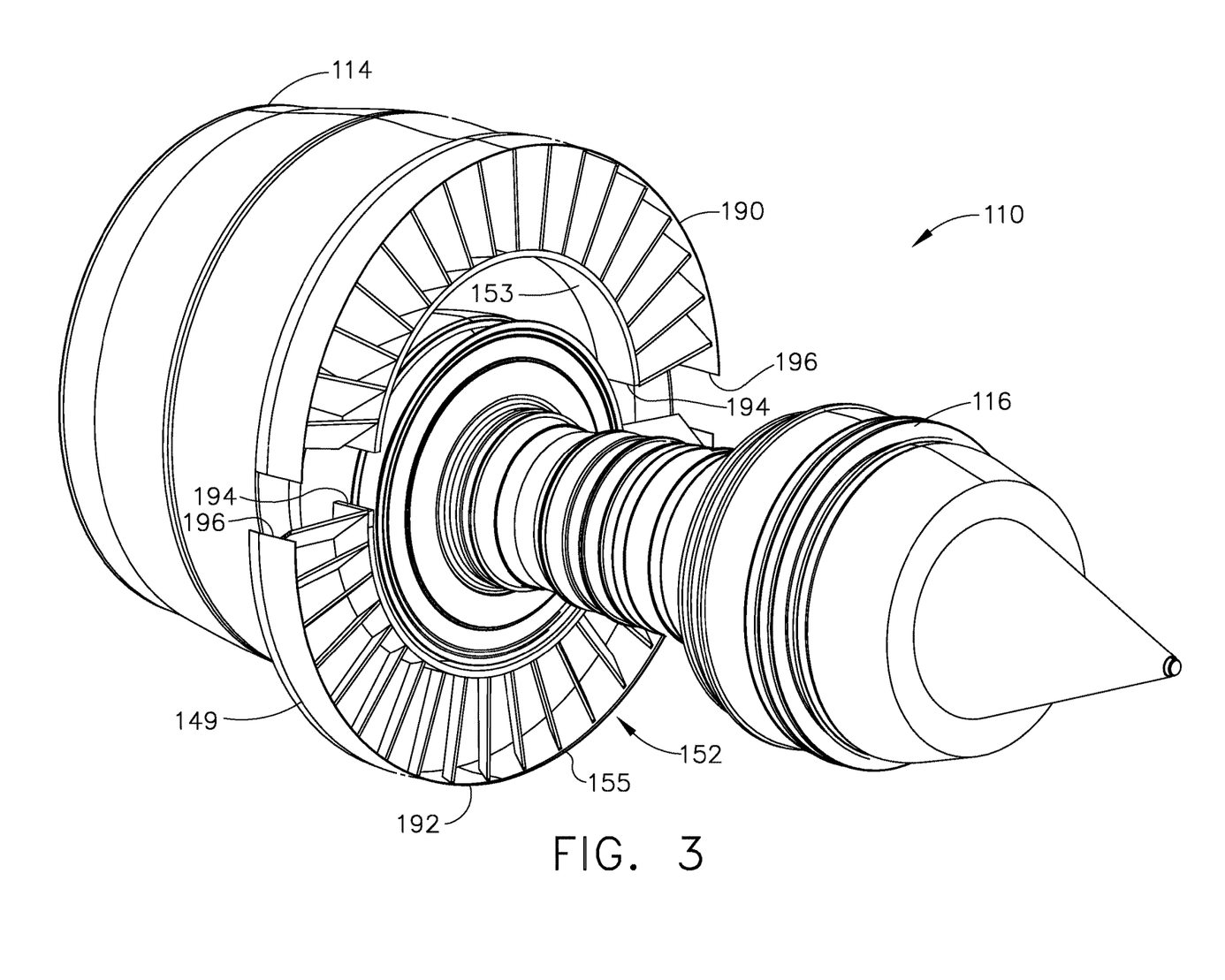
FIG. 3 is a perspective view of an exemplary turbofan engine shown in FIGS. 1 and 2.

FIG. 3 is a perspective view of an exemplary turbofan engine 110 including fan case assembly 114, core gas turbine engine 116, and outlet guide vane assembly 152 (as shown in FIGS. 1 and 2). In the exemplary embodiment outlet guide vane assembly 152 includes the plurality of outlet guide vane segments 149 such as a first outlet guide vane segment 190 and a second outlet guide vane segment 192. First outlet guide vane segment 190 is split from second outlet guide vane segment 192 at a radially inner fan hub frame flange split line 194 and a radially outer fan case flange split line 196. It should be appreciated that outlet guide vane assembly 152 is shown as first and second outlet guide vane segments 190 and 192, outlet guide vane assembly 152 may be split into any number of segments that enables turbofan engine 110 to function as described herein.

In the exemplary embodiment, turbofan engine 110 includes two assemblies, fan case assembly 114 and core gas turbine engine 116, simplifying maintenance and shipping.

For example, to separate fan case assembly 114 from core gas turbine engine 116 for maintenance, outlet guide van assembly 152 is split into first and second outlet guide vane segments 190 and 192. First outlet guide vane segment 190 is decoupled from core gas turbine engine 116 at radially inner fan hub frame flange 153. Second outlet guide vane segment 192 is decoupled from fan case assembly 114 at radially outer fan case flange 155. Core gas turbine engine 116 is shifted in a radial direction away from the remaining first outlet guide vane segment 190. Core gas turbine engine 116 is then shifted radially to clear the radially inner diameter of first outlet guide vane segment 190 that is smaller than the radially outer diameter of booster compressor 122. Core gas turbine engine 116 with second outlet guide vane segment 192 is removed from fan case assembly 114 with first outlet guide vane segment 190 in axial direction A (shown in FIG. 1). In some embodiments second outlet guide vane segment 192 may also be decoupled and removed from core gas turbine engine 116 at radially inner fan hub frame flange 153 such that outlet guide vane assembly 152 is not coupled to either fan case assembly 114 nor core gas turbine engine 116.

Conversely, to assemble turbofan engine 110, core gas turbine engine 116 with second outlet guide vane segment 192 is inserted in axial direction A (shown in FIG. 1) into fan case assembly 114 with first outlet guide vane segment 190. Core gas turbine engine 116 is shifted in a radial direction towards first outlet guide vane segment 190 to clear the radially inner diameter of first outlet guide vane segment 190 that is smaller than the radially outer diameter of booster compressor 122. First outlet guide vane segment 190 is coupled to core gas turbine engine 116 at radially inner fan hub frame flange 153 and second outlet guide vane segment 192 is coupled to fan case assembly 144 at radially outer fan case flange 155 forming turbofan engine 110.

Figure 4:
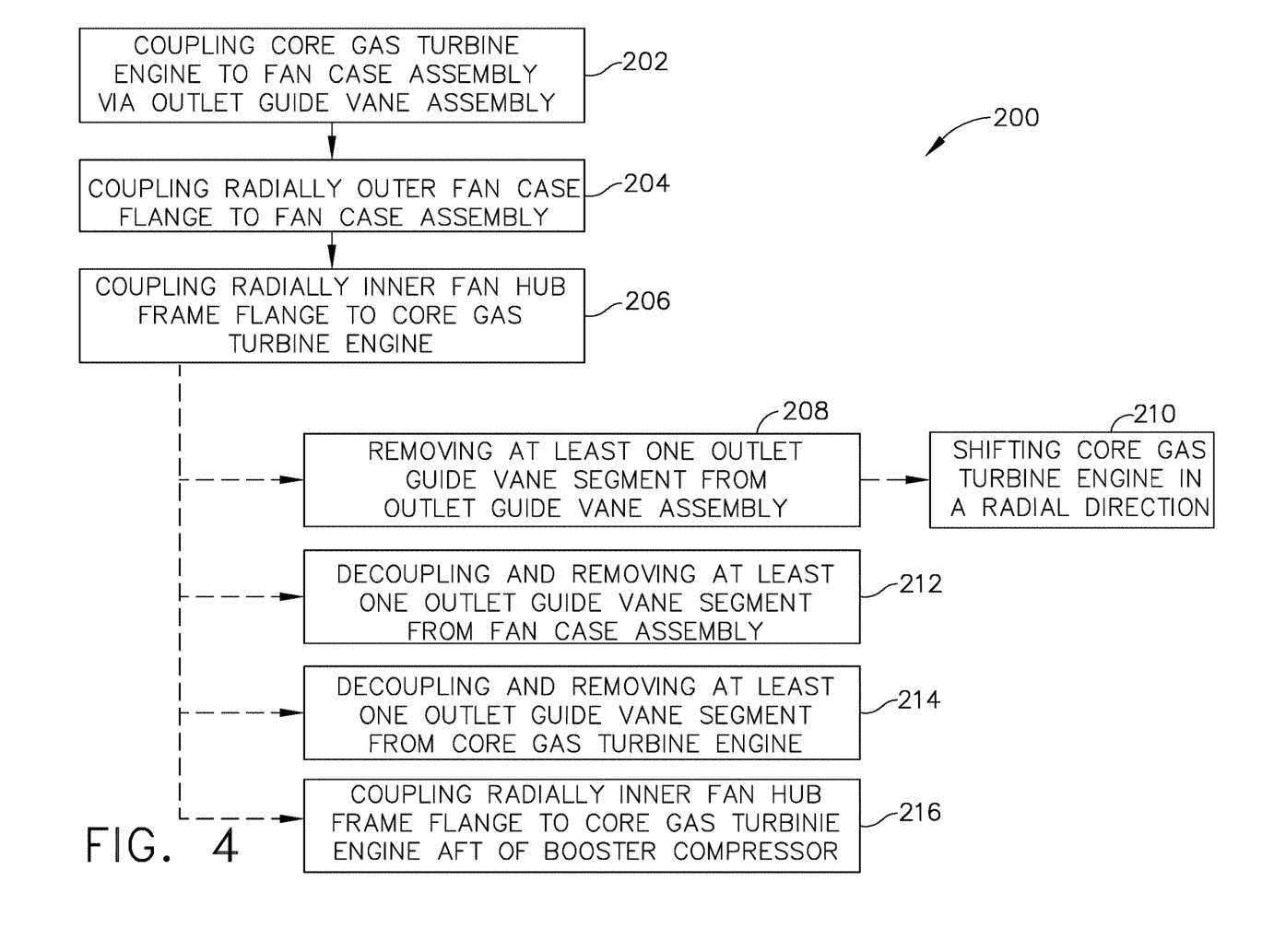
FIG. 4 is a flow diagram of an exemplary embodiment of a method of assembling a turbofan engine assembly, such as the turbofan engine shown in FIGS. 1-3.

FIG. 4 is a flow diagram of an exemplary embodiment of a method 200 of assembling a turbofan engine assembly, such as turbofan engine 110. With reference also to FIGS. 1-3, exemplary method 200 includes coupling 202 core gas turbine engine 116 to fan case assembly 114 via outlet guide vane assembly 152. Coupling 202 core gas turbine engine 116 to fan case assembly 114 further includes coupling 204 radially outer fan case flange 155 to fan case assembly 114 and coupling 206 radially inner fan hub frame flange 153 to core gas turbine engine 116.

In some embodiments, method 200 further includes removing 208 at least one outlet guide vane segment 149 from outlet guide vane assembly 152 and shifting 210 core gas turbine engine 116 in a radial direction away from remaining outlet guide vane segments 149. Furthermore, in certain embodiments, method 200 includes decoupling 212 and removing at least one outlet guide vane segment 149 from fan case assembly 114. Also, in some embodiments, method 200 includes decoupling 214 and removing at least one outlet guide vane segment 149 from core gas turbine engine 116. Method 200 may also include coupling 216 radially inner fan hub frame flange 153 to core gas turbine engine 116 aft of booster compressor 122.

The above-described embodiments of the turbofan engine assembly facilitate reducing the outer diameter of the fan case assembly and/or increasing fan diameter. Specifically, the turbofan engine assemblies and methods described herein allow for the outer diameter of the core gas turbine engine to be smaller than the inner diameter of the outlet guide vane assembly. The outlet guide vane assembly includes a plurality of outlet guide vane segments spaced circumferentially about the core gas turbine engine. Each outlet guide vane segment includes a radially inner fan hub frame flange configured to couple to the core gas turbine engine, a radially outer fan case flange configured to couple to the fan case assembly, and a plurality of outlet guide vanes extending therebetween. The core gas turbine engine is removable from the fan case assembly by decoupling at least one outlet guide vane segment from the core gas turbine engine and/or fan case assembly and shifting the core gas turbine engine in a radial direction before moving in an axial direction. Disassembling the turbofan engine assembly as described herein provides for maintaining the time requirement to remove the turbofan engine assembly to one working shift and enabling conventional shipping means for the core gas engine turbine assembly.

An exemplary technical effect of the methods, systems, and apparatus described herein includes at least one of: (a) reducing the outer diameter of the fan case assembly; (b) reducing overall engine weight; (c) reducing nacelle drag; (d) reducing time to split core gas turbine engine and fan case assembly; (e) increasing fan diameter and air flow; and (f) increasing booster compressor outer diameter.

Exemplary embodiments of methods, systems, and apparatus for the turbofan engine assemblies are not limited to the specific embodiments described herein, but rather, components of the systems and/or steps of the methods may be utilized independently and separately from other components and/or steps described herein. For example, the methods may also be used in combination with other systems requiring turbofan assemblies, and the associated methods, and are not limited to practice with only the systems and methods as described herein. Rather, the exemplary embodiment can be implemented and utilized in connection with many other applications, equipment, and systems that may benefit from reducing fan case assembly diameter.

Although specific features of various embodiments of the disclosure may be shown in some drawings and not in others, this is for convenience only. In accordance with the principles of the disclosure, any feature of a drawing may be referenced and/or claimed in combination with any feature of any other drawing.

This written description uses examples to disclose the embodiments, including the best mode, and also to enable any person skilled in the art to practice the embodiments, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method of assembling a turbofan engine, the method comprising:
   inserting a core gas turbine engine into a fan case assembly in an axial direction, the inserting taking place with a first outlet guide vane segment of an outlet guide vane assembly coupled to the fan case assembly and a second outlet guide vane segment of the outlet guide vane assembly decoupled from the fan case assembly, and the core gas turbine engine having been shifted in a radial direction away from the first outlet guide vane segment to clear a radial inner diameter of the first outlet guide vane segment; and
   coupling the core gas turbine engine to the fan case assembly, comprising coupling the first outlet guide vane segment to the core gas turbine engine and coupling the second outlet guide vane segment to the fan case assembly;
   wherein the core gas turbine engine comprises a booster compressor and the first outlet guide vane segment and the second outlet guide vane segment have a radially inner diameter that is smaller than a radially outer diameter of the booster compressor.

2. The method of claim 1, wherein coupling the core gas turbine engine to the fan case assembly comprises coupling the second outlet guide vane segment to the core gas turbine engine.

3. The method of claim 2, wherein coupling the core gas turbine engine to the fan case assembly comprises coupling the first outlet guide vane segment and the second outlet guide vane segment to a fan frame hub on the core gas turbine engine.

4. The method of claim 3, wherein coupling the first outlet guide vane segment and the second outlet guide vane segment to the fan frame hub on the core gas turbine engine comprises coupling a radially inner fan hub frame flange of the first outlet guide vane segment to the fan frame hub and coupling a radially inner fan hub frame flange of the second outlet guide vane segment to the fan frame hub.

5. The method of claim 4, wherein coupling the core gas turbine engine to the fan case assembly comprises coupling the radially inner fan hub frame flange of the first outlet guide vane segment to the core gas turbine engine aft of the booster compressor and coupling the radially inner fan hub frame flange of the second outlet guide vane segment to the core gas turbine engine aft of the booster compressor.

6. The method of claim 4, wherein coupling the second outlet guide vane segment to the fan case assembly comprises coupling a radially outer fan case flange of the second outlet guide vane segment to the fan case assembly.

7. The method of claim 1, comprising inserting the core gas turbine engine into the fan case assembly in an axial direction with the second outlet guide vane segment coupled to the core gas turbine engine.

8. The method of claim 1, comprising:
   shifting the core gas turbine engine in a radial direction away from the first outlet guide vane segment to clear the radially inner diameter of the first outlet guide vane segment before inserting the core gas turbine engine into the fan case assembly in an axial direction.

9. A method of disassembling a turbofan engine, the method comprising:
   decoupling a first outlet guide vane segment from a core gas turbine engine and decoupling a second outlet guide vane segment from a fan case assembly, the first outlet guide vane segment remaining coupled to the fan case assembly;
   shifting the core gas turbine engine in a radial direction away from the first outlet guide vane segment to clear the radial inner diameter of the first outlet guide vane segment; and
   removing the core gas turbine engine from the fan case assembly in an axial direction;
   wherein the core gas turbine engine comprises a booster compressor and the first outlet guide vane segment and the second outlet guide vane segment have a radially inner diameter that is smaller than a radially outer diameter of the booster compressor.

10. The method of claim 9, removing the core gas turbine engine from the fan case assembly in an axial direction with the second outlet guide vane segment coupled to the core gas turbine engine.

11. The method of claim 9, comprising decoupling the second outlet guide vane segment from the core gas turbine engine prior to removing the core gas turbine engine from the fan case assembly.

12. The method of claim 9, wherein decoupling the first outlet guide vane segment from the core gas turbine engine comprises decoupling the first outlet guide vane segment from a fan frame hub on the core gas turbine engine.

13. The method of claim 12, wherein decoupling the first outlet guide vane segment from the fan frame hub on the core gas turbine engine coupling decoupling a radially inner fan hub frame flange of the first outlet guide vane segment from the fan frame hub.

14. The method of claim 13, wherein the fan frame hub is located aft of the booster compressor.

15. The method of claim 9, wherein decoupling the second outlet guide vane segment from the fan case assembly comprises decoupling a radially outer fan case flange of the second outlet guide vane segment from the fan case assembly.

16. A partially disassembled turbofan engine assembly, comprising:
  a core gas turbine engine comprising a booster compressor;
  a fan case assembly; and
  a outlet guide vane assembly operable for coupling the core gas turbine engine to the fan case assembly, the outlet guide vane assembly comprising a first outlet guide vane segment and a second outlet guide vane segment;
  wherein the core gas turbine engine is decoupled from the fan case assembly, the first outlet guide vane segment coupled to the fan case assembly but decoupled from the core gas turbine engine, and the second outlet guide vane segment coupled to the core gas turbine engine but decoupled from the fan case assembly; and
  wherein the first outlet guide vane segment and the second outlet guide vane segment have a radially inner diameter that is smaller than a radially outer diameter of the booster compressor.

17. The partially disassembled turbofan engine assembly of claim 16,
  wherein the first outlet guide vane segment is split from the second outlet guide vane segment at a radially inner fan hub frame flange split line and a radially outer fan case flange split line such that at least the second outlet guide vane segment is removable from the outlet guide vane assembly.

18. The partially disassembled turbofan engine assembly of claim 16, wherein the core gas turbine engine is configured to shift in a radial direction away from at least the first outlet guide vane segment to clear the radially inner diameter of the first outlet guide vane segment before being inserted into or removed from the fan case assembly in an axial direction, the radially inner diameter of the first outlet guide vane segment being smaller than the radially outer diameter of the booster compressor.

19. The partially disassembled turbofan engine assembly of claim 16, wherein the core gas turbine engine comprises a fan frame hub located aft of the booster compressor, and the first outlet guide vane segment comprises a radially inner fan hub frame flange, the radially inner fan hub frame flange couplable to the fan frame hub.

20. The partially disassembled turbofan engine assembly of claim 16, wherein the first outlet guide vane segment comprises a first radially outer fan case flange configured to couple the first outlet guide vane segment to the fan case assembly, and wherein the second outlet guide vane segment comprises a second radially outer fan case flange configured to couple the second outlet guide vane segment to the fan case assembly.

* * * * *